United States Patent
Seno et al.

(10) Patent No.: US 7,049,918 B2
(45) Date of Patent: May 23, 2006

(54) MAGNETIZING METHOD AND APPARATUS FOR TONE WHEEL

(75) Inventors: Hiroshi Seno, Okayama (JP); Hideo Mizuta, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 11/168,287

(22) Filed: Jun. 29, 2005

(65) Prior Publication Data

US 2006/0001514 A1    Jan. 5, 2006

(30) Foreign Application Priority Data

Jun. 30, 2004   (JP)   ............................ 2004-192408
Oct. 21, 2004   (JP)   ............................ 2004-306609

(51) Int. Cl.
  *H01F 13/00*   (2006.01)
(52) U.S. Cl. .................................................. 335/284
(58) Field of Classification Search ................ 335/284, 335/302–306; 324/174
  See application file for complete search history.

(56) References Cited

U.S. PATENT DOCUMENTS

2001/0030533 A1*  10/2001  Iwamoto et al. ............ 324/174

FOREIGN PATENT DOCUMENTS

| JP | 2002-164213 | 6/2002 |
| JP | 2002-318239 | 10/2002 |
| JP | 2003-344098 | 12/2003 |

\* cited by examiner

*Primary Examiner*—Ramon M. Barrera
(74) *Attorney, Agent, or Firm*—Bacon & Thomas

(57) ABSTRACT

A magnetizing method for tone wheel and apparatus, wherein the method comprises the steps of preparing a ring reinforcement made of magnetic material and attached to an annular body to be magnetized, the ring reinforcement comprising a tubular part and an other part integrally formed with the tubular part; holding the tubular part of the ring reinforcement with a fixture such as a jaw type chuck made of non-magnetic material; and apply an alternate magnetic flux to the annular body while axially rotating the fixing means, keeping one end of a magnetizing yoke approximate to the surface of the annular body, the alternate magnetic flux forming a circular closed loop which passes the one end of the magnetizing yoke and the other end of the magnetizing yoke, via the annular body and the ring reinforcement midway, thereby magnetizing the annular body in a manner that S poles and N poles are alternately formed along its periphery.

12 Claims, 13 Drawing Sheets

MAGNETIZING METHOD AND APPARATUS FOR TONE WHEEL

FIELD OF THE INVENTION

The present invention relates to a magnetizing method and apparatus for tone wheel constituting a magnetic encoder for detecting the revolution velocity of wheels for automobile.

PRIOR ART

Magnetic encoder for detecting the revolution velocity is sometimes equipped with wheels of automobile. Such a magnetic encoder may be comprised of a tone wheel attached on a rotating member of wheel like a slinger of a seal ring of a wheel bearing system and a magnetic sensor which is fixed on the vehicle body and is provided close to the surface of the tone wheel. The tone wheel is constructed such that a rubber material mixed with magnetic powder is formed like a circle along the shape of the slinger and S poles and N poles are alternately magnetized along the circumferential direction.

Magnetizing method for tone wheel includes a fixing type in which a body to be magnetized is fixed and is entirely magnetized with a magnetizing yoke having plural magnetizing parts, and a rotary type in which an object body to be magnetized is magnetized by means of a pair of magnetizing parts while being rotated. The latter rotary magnetizing method is often used because it is superior in mass production and magnetizing accuracy. JP-A-2002-164213, JP-A-2002-318239 and JP-A-2003-344098 disclose an embodiment of rotary type magnetizing method and apparatus for the above-mentioned tone wheel (sometimes it is called as a magnetic encoder).

According to such magnetizing method and apparatus disclosed in the above-mentioned publication, a magnetizing yoke is arranged such that one end thereof faces to the upper face of an annular magnetic material, the other end faces to the lower surface of the annular magnetic material, and the annular magnetic material is magnetized while being rotated. Or a wheel bearing system is provided for a spindle, one end of a magnetizing yoke faces to a magnetic encoder attached to a wheel bearing system and the other end thereof faces to a rotary member (hub wheel) of the wheel bearing system so as to face each other, and a tone wheel is magnetized while rotating the spindle. Further, a magnetic encoder is provided for a rotary member (fixing means) of magnetic body, one end of a magnetic yoke faces to the magnetic encoder and the other end thereof faces to the rotary member so as to face each other, and a tone wheel is magnetized while rotating the rotary member.

In case of magnetizing in such a manner that facing ends of a magnetizing yoke interpose an annular magnetic body, the magnetizing yoke is required to be highly accurately positioned up and down and right and left. Further, there is a problem that the magnetizing yoke does not follow the oscillation of a rotating magnetizing surface because there is some gap between the magnetizing yoke and the annular magnetic body. In case of magnetizing when the magnetic encoder is incorporated into a wheel bearing system including a hub wheel, the apparatus is enlarged and is not applicable to a general bearing production and a general bearing production system. Further in case of magnetizing such that the magnetic encoder is provided for a rotary fixing means of magnetic body and the other end of the magnetizing yoke faces to the fixing means, the fixing means of magnetic body constitutes apart of a circular closed loop of magnetic flux. When a jaw type chuck means (most popular fixing means) is used as a fixing means, space is always generated between the jaws, so that magnetic fluctuation of magnetizing is caused in the space, thereby having fear of reducing the magnetizing quality.

SUMMARY OF THE INVENTION

The present invention is proposed considering the above-mentioned problems and one object of the present invention is to provide a magnetizing method and apparatus for tone wheel which do not reduce magnetizing quality utilizing the advantage of rotary method even if a fixing means is a jaw type chuck means.

According to the present invention, a magnetizing method for tone wheel is comprised of the steps of preparing a ring reinforcement made of magnetic material and attached to an annular body to be magnetized, the ring reinforcement comprising a tubular part and an other part integrally formed with the tubular part, holding the tubular part of the ring reinforcement with a fixing means such as a jaw type chuck means made of non-magnetic material, and applying an alternate magnetic flux to the annular body while axially rotating the fixing means, keeping one end of a magnetizing yoke approximate to the surface of the annular body, the alternate magnetic flux forming a circular closed loop which passes the one end of a magnetizing yoke and other end of the magnetizing yoke, via the annular body and the ring reinforcement midway, whereby the annular body is magnetized in a manner that S poles and N poles are alternately formed along its periphery.

Further according to the present invention, a magnetizing apparatus for tone wheel is comprised of an axially rotatable fixing means comprised of a jaw type chuck means made of non-magnetic material, for holding a tubular part of a ring reinforcement on which an annular body to be magnetized is attached, the ring reinforcement comprising the tubular part and an other part integrally formed with the tubular part, and a magnetizing yoke provided with at least two magnetizing ends. The apparatus generates a circular closed loop of an alternate magnetic flux passing the one end of the magnetizing yoke and the other end of the magnetizing yoke via the annular body and the ring reinforcement midway, while axially rotating the fixing means, keeping one end of the magnetizing yoke approximate to the surface of the annular body, whereby the annular body is magnetized in a manner that S poles and N poles are alternately formed along its peripheral direction.

According to the above-mentioned magnetizing method and apparatus for tone wheel, the annular body may be made of a rubber material mixed with magnetic powder. Further according to the magnetizing method and apparatus for tone wheel, the jaw type chuck means may have plural chuck jaws arranged in its circumferential direction and movable to its radial direction, for chucking the tubular part of the ring reinforcement. Still further according to the magnetizing method and apparatus for tone wheel, a ring-like positioning table for positioning the annular body attached on the ring reinforcement is disposed at a predetermined position between the ring reinforcement and the other end of the magnetizing yoke, prior to applying alternate magnetic flux to the annular body, and the alternate magnetic flux applied to the annular body forms a circular closed loop which passes the one end of the magnetizing yoke and other end of the magnetizing yoke, via the annular body, the ring reinforcement and the positioning table midway.

According to the magnetizing method and apparatus for tone wheel of the present invention in which the tone wheel is magnetized while the fixing means is axially rotated when one end of the magnetizing yoke is approached to the surface of the annular body to be magnetized, the one end of the magnetizing yoke, the annular body to be magnetized, the ring reinforcement made of magnetic material, and the other end of the magnetizing yoke form a circular closed loop of magnetic flux or the one end of the magnetizing yoke, the annular body to be magnetized, the ring reinforcement made of magnetic material, the positioning table, and the other end of the magnetizing yoke form a circular closed loop of magnetic flux, so that the fixing means does not relate to the circular closed loop. Further, because the fixing means is made of non-magnetic material, the magnetic flux does not leak into the fixing means to disturb the circular closed loop. Even if the fixing means is a jaw type chuck means, the space between the jaws does not cause lack of magnetizing (fluctuation of magnetic force), thereby achieving exact and accurate magnetizing. The annular body to be magnetized is fixed to the fixing means rotating via the ring reinforcement, so that the oscillation of annular body to be magnetized accompanied with rotation is made small and the following performance of magnetizing yoke becomes superior. Further, the fixing means holds and fixes the ring reinforcement attached with the annular body to be magnetized, thereby reducing a required rotating power and downsizing the apparatus comparing with an apparatus in which a hub wheel is fixed. Therefore, such a system can be applied to a production system of a general purpose bearing and bearing member.

According to the magnetizing method and apparatus for tone wheel of the present invention in which the annular body to be magnetized is made of rubber material mixed with magnetic powder, the tone wheel is magnetized when the annular body to be magnetized made of rubber material is attached to the ring reinforcement, so that the annular body is kept its shape during magnetizing to achieve accurate magnetizing. The annular body which has been magnetized is incorporated into the seal ring of the bearing together with the ring reinforcement as a tone wheel to constitute a combination seal ring, thereby contributing efficient production system of bearing. In this case, the shape is appropriately set in advance and the ring reinforcement is designed to be the slinger of the rotating member, thereby contributing to reduce the number of members for bearing.

Still further according to the magnetizing method and apparatus for tone wheel of the present invention in which the jaw type chuck means has plural chuck jaws arranged in the circumferential direction and movable into the radial direction for chucking the tubular part of the ring reinforcement, a general chuck apparatus is used as it is, thereby stably holding and fixing the ring reinforcement by means of a simple apparatus.

DETAILED DESCRIPTION OF THE INVENTION

Figure 1:
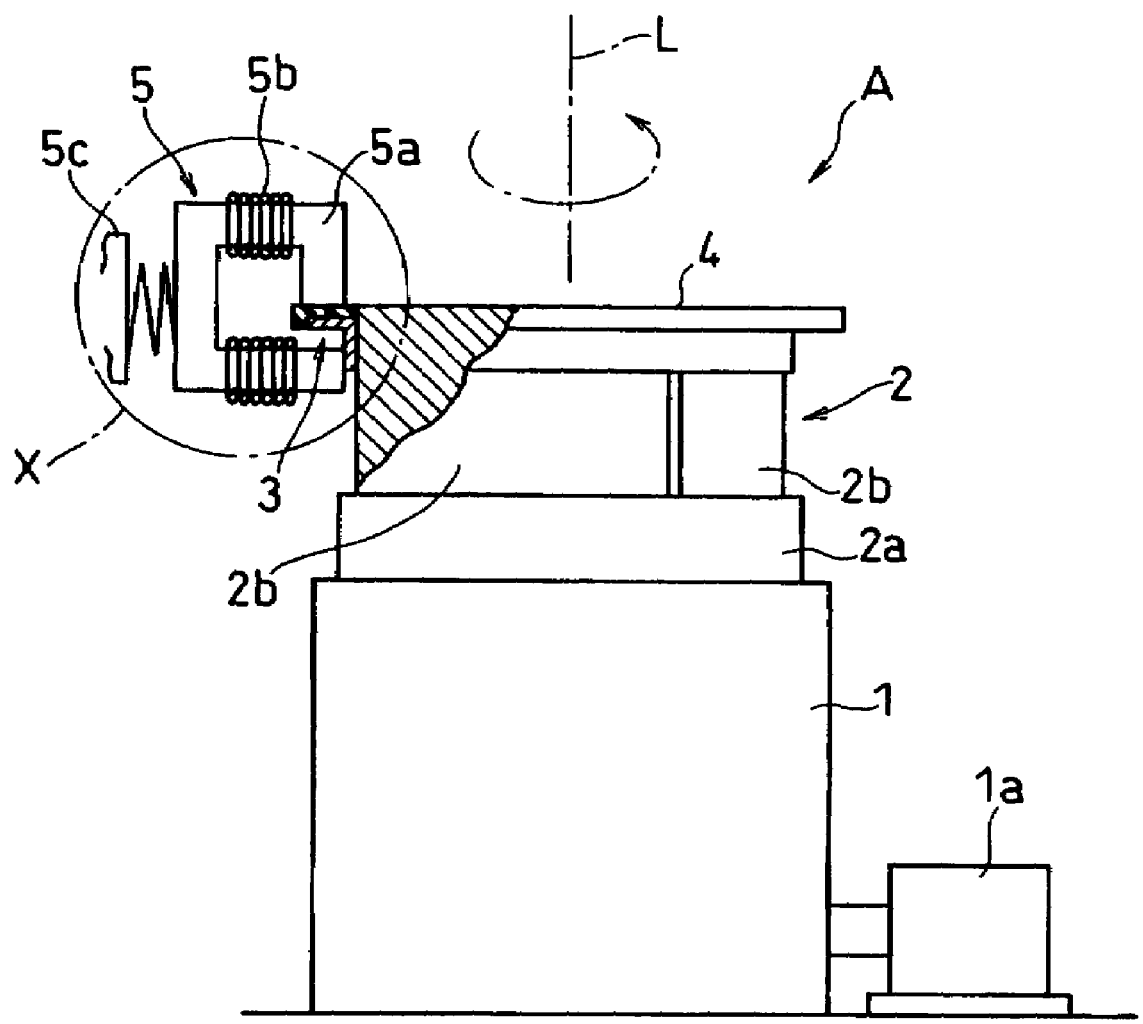
FIG. 1 is a partially cutaway front view showing a diagrammatical construction of a magnetizing apparatus of the present invention.
Figure 2:
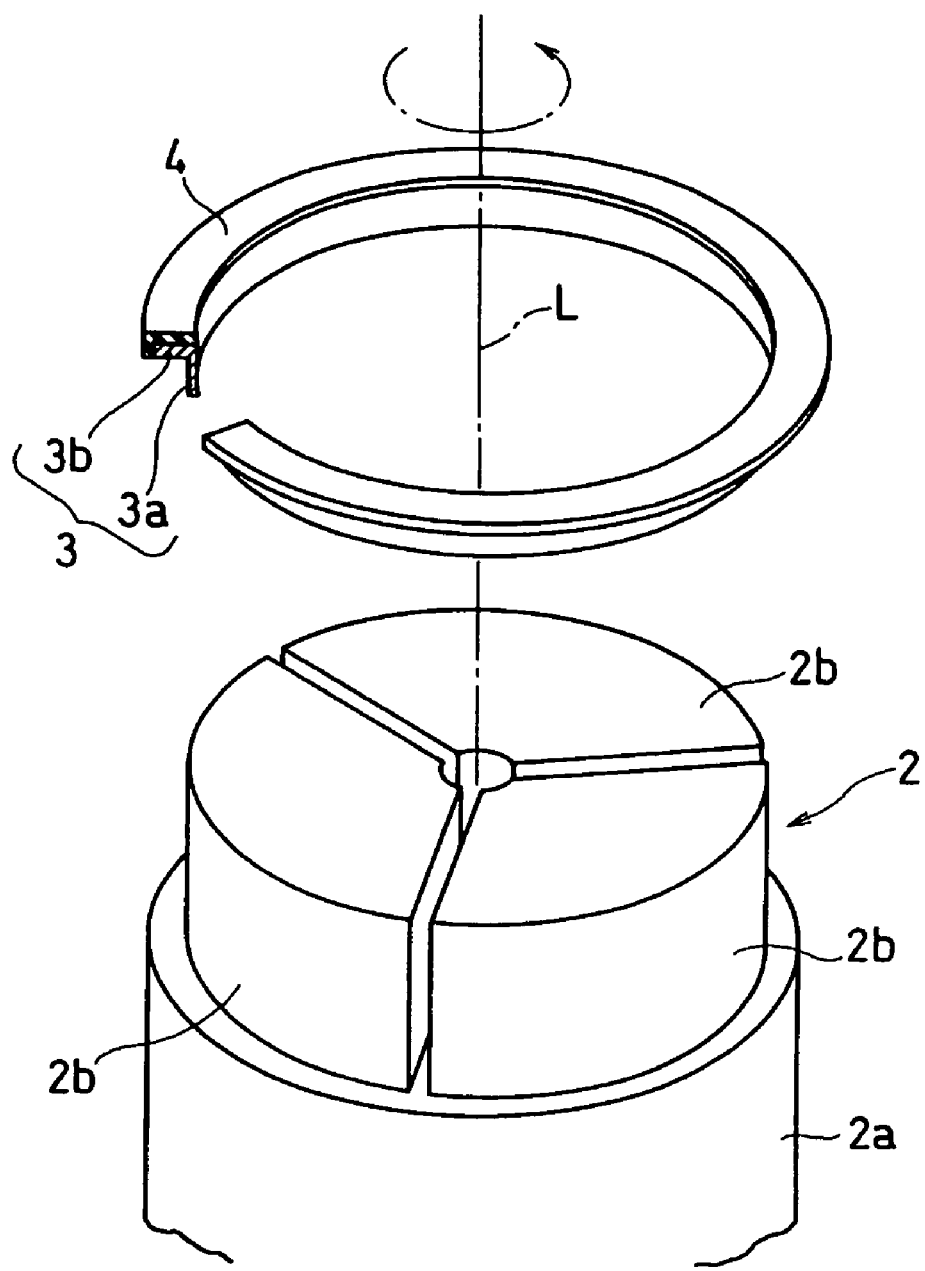
FIG. 2 is a perspective view of an essential part of the apparatus of FIG. 1.
Figure 3:
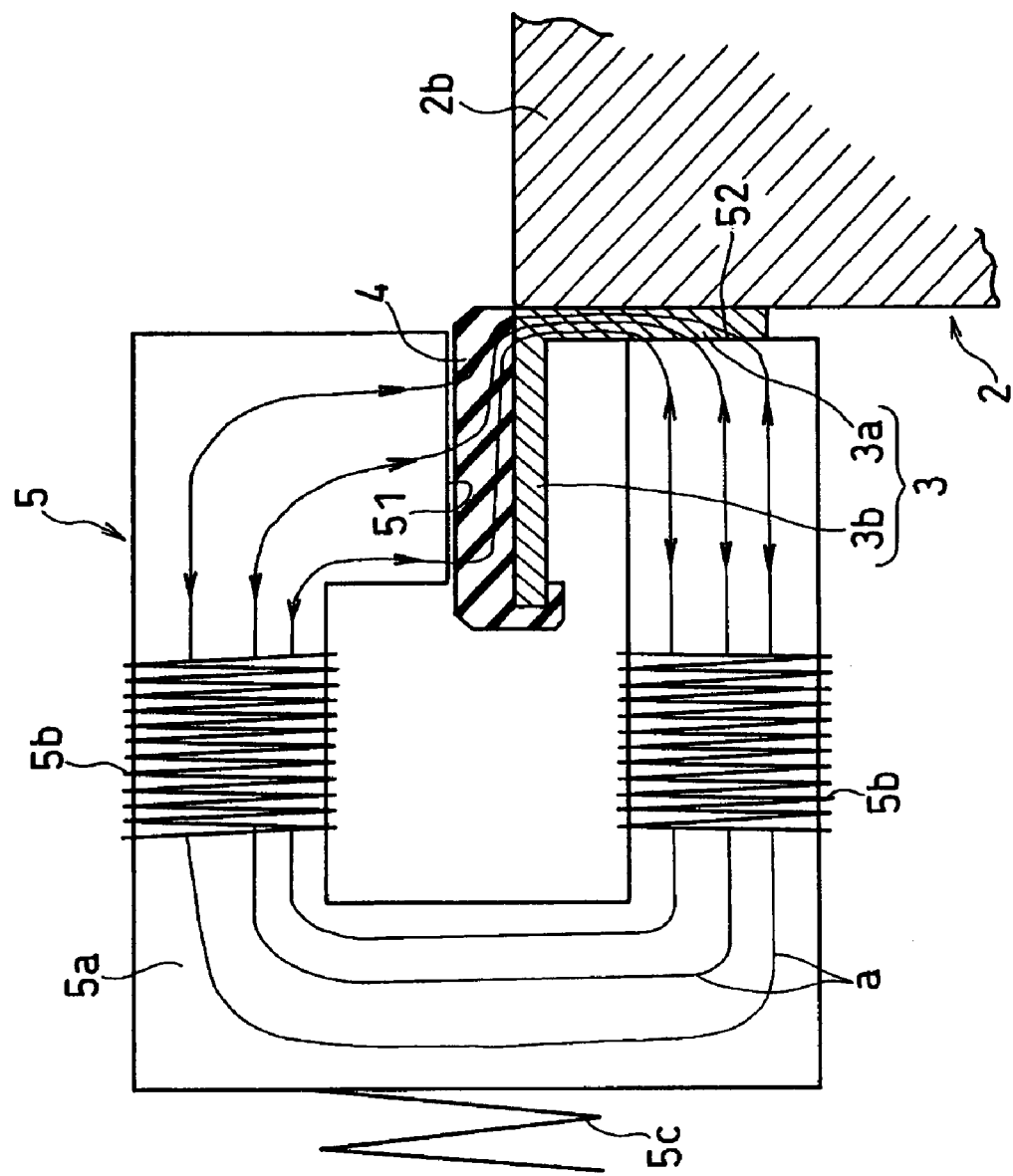
FIG. 3 is an enlarged view of the area "X" of FIG. 1.

Now preferred embodiment of the present invention will be explained referring to the attached drawings. FIG. 1 is a partially cutaway front view showing a diagrammatical construction of the magnetizing apparatus of the present invention. FIG. 2 is a perspective view of an essential part of the apparatus of FIG. 1. FIG. 3 is an enlarged view of the area "X" of FIG. 1. FIG. 4–FIG. 9 are an enlarged view of the area "X" according to other embodiments, respectively. FIG. 13 is a partially cutaway perspective view of an essential part of a modified embodiment shown in FIG. 10–FIG. 12.

Embodiment 1

In the magnetizing apparatus A shown in FIG. 1–FIG. 3, a fixture 2 is mounted on a rotary spindle apparatus 1 so as to be rotatable around an axis L. The reference numeral 1a is a rotary drive motor of the spindle apparatus 1. The fixture 2 is comprised of a jaw type chuck means and three chuck jaws 2b . . . of sector form (120 degrees) made of non-magnetic material are provided on a base 2a so as to be movable in radial direction. In the figure when the chuck jaws 2b . . . are moved in centrifugal direction, they are tightly held in an inner tubular part of a tubular member (work) to hold and fix the work. Although it is not shown in the figure, it goes without saying that an automatic or manual operation means for adjusting the movement of the jaw chucks 2b . . . in radial direction is provided for the base 2a. The chuck jaws 2b . . . may be prepared corresponding to the size of work and detachable and exchangeable by means of a fixture (not shown) from the base 2a.

A ring reinforcement 3 is formed by sheet metal work of a magnetic metal like a stainless steel and is comprised of a tubular part 3a and an outward flange portion 3b (two parts, namely a tubular part and an other part integrally formed with the tubular part). The annular object to be magnetized 4 is made of a rubber material like FKM, NBR, H-NBR, EPDM, CR, ACM, AEM, VMQ, or FVMQ in which magnetic powder like ferrite is mixed. The object 4 is integrally attached on the outer surface and outer circumference of the outward flange portion 3b by means of vulcanization. The ring reinforcement 3 integrally attached with the annular body to be magnetized 4 is used as a work and the tubular part 3a thereof is held and fixed by the fixture 2.

A magnetizing yoke 5 is constructed such that a coil 5b is wound around a ring breakage iron core 5a like the letter C and electric current is supplied to the coil 5*b* to generate a magnetic field from the ring breakage iron cores 51, 52. The magnetizing yoke 5 is provided near the fixture 2. A pressing means 5*c* is provided behind the magnetizing yoke 5 so as to slightly press the ring breakage iron core 52 onto the outer circumference of the tubular part 3*a* by means of a spring.

A magnetizing method of the magnetizing apparatus A will be explained. The ring reinforcement 3 is formed by metal sheet work of a magnetic material, the rubber material mentioned above is attached on the outer surface (flat surface) and peripheral edge of the outward flange portion 3*b* to be integrated, thus forming the annular body to be magnetized 4. The ring reinforcement 3 integrated with the annular body to be magnetized 4 is held and fixed with the tubular part 3*a* by means of chuck jaws 2*b* . . . of the fixture 2. The magnetizing yoke 5 is provided near the fixture 2 in such a manner that the ring breakage end 52 (the other end) of the magnetizing yoke 5 is pushed so as to slightly get in touch with the outer circumference of the tubular part 3*a* by means of the pressing means 5*c* and another ring breakage end 51 (one end) thereof is approached into the surface of the annular body to be magnetized 4.

A motor 1*a* of the rotary spindle apparatus 1 is driven to rotate the fixture 2 around the axis L and electric current is applied to the coil 5*b* wound around the magnetizing yoke 5. Application of electric current is controlled based on a control sequence which is programmed to alternately reverse current direction, i.e. change current toward a positive or negative direction at a short predetermined interval. As a result, a circular closed loop of a magnetic flux "a" is generated, the flux passing the ring breakage end 51—the annular body to be magnetized 4—the ring reinforcement 3—the ring breakage end 52 and returning to the ring breakage 51. The direction of the magnetic flux "a" is changed depending on an alternate application of the electric current, thereby alternately changing the passing direction of the flux at a short interval as shown at the arrows in FIG. 3. During such application of alternate magnetic flux, the annular body to be magnetized 4 rotates around the axis L, so that the magnetic powder contained in the annular body is magnetized in a manner that S poles and N poles are alternately appeared along its periphery of the annular body, thereby making a multi-pole magnetized tone wheel.

The fixture 2 is made of non-magnetic body, therefore, the magnetic flux "a" does not leak into the fixture 2, the density of magnetic flux "a" in the circular closed loop is kept constant, and the magnetizing pattern formed on the annular body to be magnetized 4 becomes constant along the circumferential direction, thereby obtaining a tone wheel of good quality. The fixture 2 is comprised of a jaw type chuck means, however, the space between the jaws does not affect magnetizing, so that a general purpose jaw type chuck means is used as a fixture, thereby obtaining wide design freedom. Further, the positioning of the magnetizing yoke 5 is executed by slightly pressing the ring breakage end 52 into the outer circumference of the tubular part 3*a* by means of the pressing means 5*c*, thereby contributing accuracy and facilitation.

Embodiment 2

Figure 4:
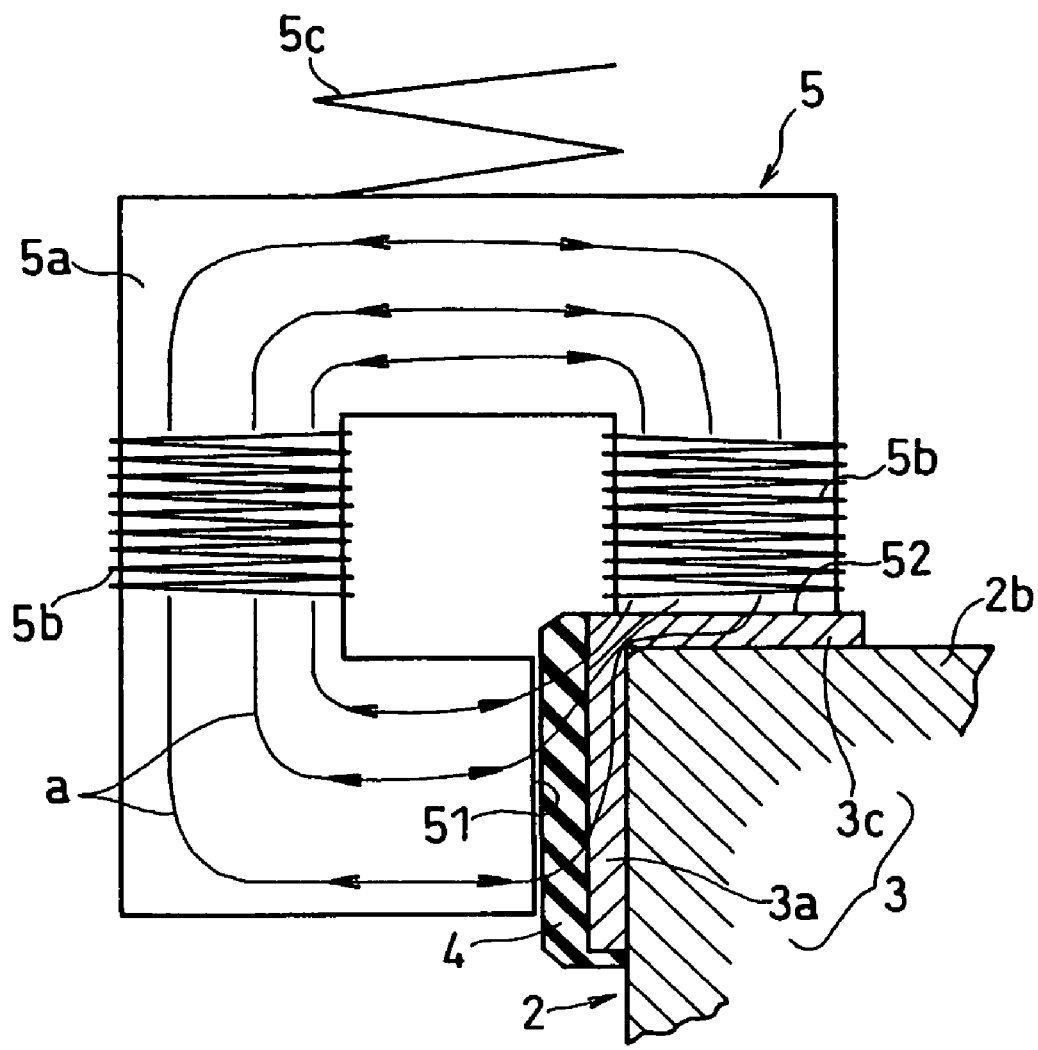
FIG. 4 is an enlarged view of the area "X" according to other embodiment.

The embodiment shown in FIG. 4 explains a magnetizing method in which a ring reinforcement 3 is made of a tubular part 3*a* and an inward flange portion 3*c* integrally formed with the tubular part 3*a* (two parts, namely a tubular part and an other part integrally formed with the tubular part) and the annular body to be magnetized 4 is integrally attached to the outer circumference of the tubular part 3*a*. In this embodiment, like the above-mentioned embodiment 1, the tubular part 3*a* of the ring enforcement 3 is held and fixed with the fixture 2. However, in this embodiment, the inward flange portion 3*c* is positioned on the fixture 2 while they are fixed. The pressing means 5*c* is provided on the magnetizing yoke 5. The magnetizing yoke 5 is provided in such a manner that the ring breakage end 52 (the other end) is pushed onto the upper face of the inward flange portion 3*c* by means of the pressing means 5*c* and the ring open end 51 (one end) is approached to the outer circumference of the tubular part 3*a* to which the annular body to be magnetized 4 is integrally attached.

After the above-mentioned preparation, an alternate electric current is applied to the coil 5*b* while rotating the fixture 2 around the axis L as mentioned above, a circular closed loop of the magnetic flux "a" is generated along the ring breakage end 51—the annular body to be magnetized 4—the ring reinforcement 3—the ring breakage end 52—the ring breakage end 51. The magnetizing pattern is formed on the annular body to be magnetized 4 in a manner that S poles and N poles are alternately repeated around the its periphery. Also in this embodiment, the fixture 2 is made of non-magnetic body, therefore, the magnetic flux "a" does not leak into the fixture 2, the density of magnetic flux "a" in the circular closed loop is kept constant, and the magnetizing pattern formed on the annular body to be magnetized 4 becomes constant along the circumferential direction, thereby obtaining a tone wheel of good quality. The fixture 2 is comprised of a jaw type chuck means, however, the space between the jaws does not affect magnetizing, so that a general purpose jaw type chuck means is used as a fixture, thereby obtaining wide design freedom, like the above-mentioned embodiment. Other constructions and effects are the same as those of the above-mentioned embodiment, so that the common members have the same reference numerals and their explanations are omitted here. The pressing means 5*c* may not be provided in the embodiments 1, 2 and the ring breakage end 52 of the magnetizing yoke 5 may be provided near the ring reinforcement 3.

Embodiment 3

Figure 5:
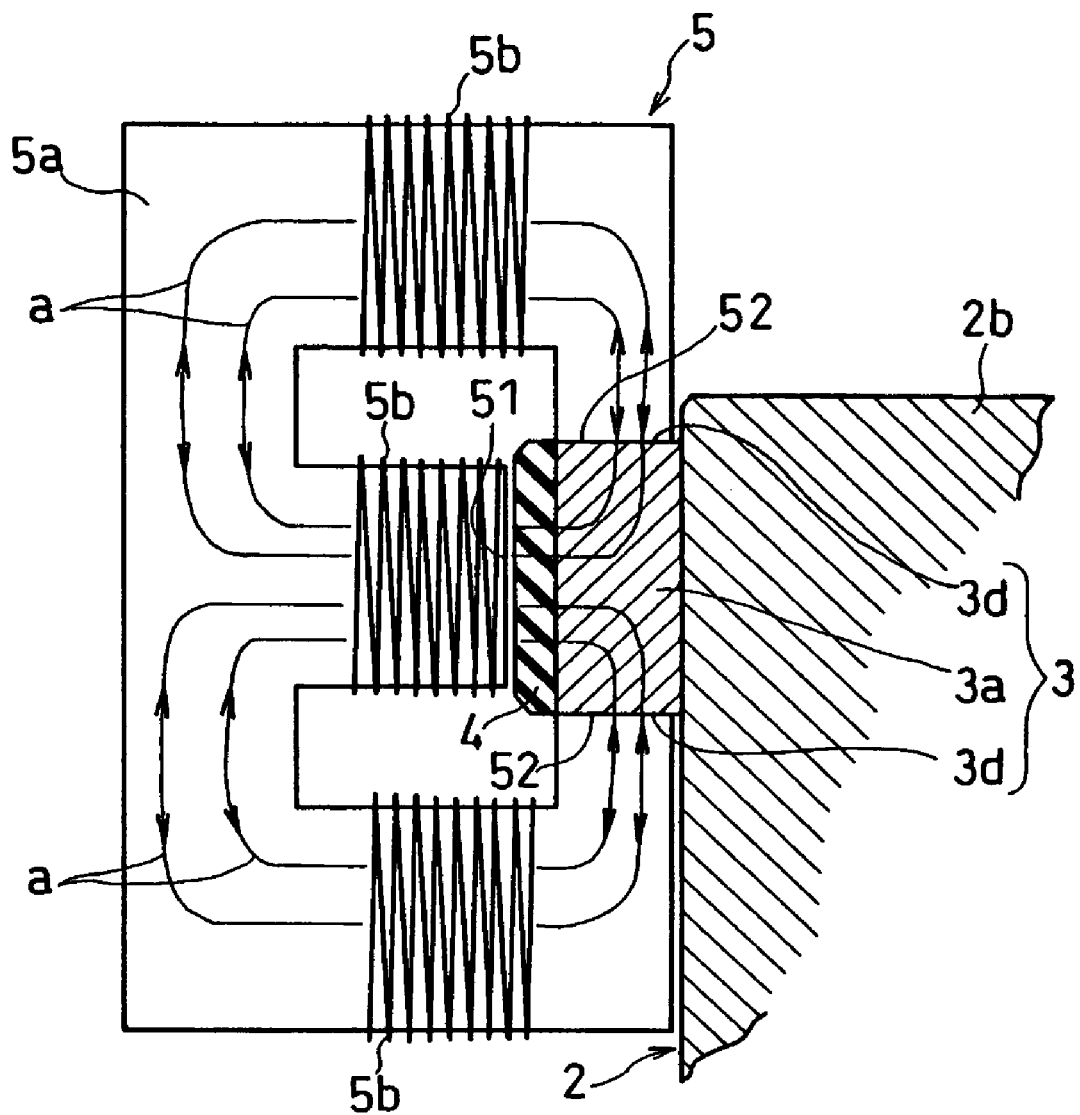
FIG. 5 is an enlarged view of the area "X" according to other embodiment.

The embodiment shown in FIG. 5 shows a magnetizing method in which a ring reinforcement 3 is comprised of a thick tubular part 3*a* and an end face 3*b* corresponding to the thickness (two parts, namely a tubular part and an other part integrally formed with the tubular part) and the annular body to be magnetized 4 is integrally attached with the outer circumference of the tubular part 3*a*. The magnetizing yoke 5 is constructed such that the coil 5*b* is wound at three parts of an iron core 5*a* like the letter E, two ends 52 (other end) are attached or approached to the upper and lower end faces 3*d* of the ring enforcement 3 respectively, and another end 51 (one end) is approached to the outer circumference of the tubular part 3*a* to which the annular body to be magnetized 4 is integrally attached.

As mentioned above, an alternate electric current is applied to the coil 5*b* while rotating the fixture 2 around the axis L as mentioned above, a circular closed loop of the magnetic flux "a" is generated along the ring breakage end 51—the annular body to be magnetized 4—the ring reinforcement 3—the ring breakage end 52—the ring breakage end 51. In this case, the magnetic flux path is divided into two directions from the ring breakage end 51 and two circular closed loops of the magnetic flux "a" are formed. The magnetizing pattern is also formed on the annular body to be magnetized 4 in a manner that S poles and N poles are alternately repeated around the circumferential direction.

Also in this embodiment, the fixture 2 is made of non-magnetic body, therefore, the magnetic flux "a" does not leak into the fixture 2, the density of magnetic flux "a" in the circular closed loop is kept constant, and the magnetizing pattern formed on the annular body to be magnetized 4 becomes constant along the circumferential direction, thereby obtaining a tone wheel of good quality. The fixture 2 is comprised of a jaw type chuck means, however, the space between the jaws does not affect magnetizing, so that a general purpose jaw type chuck means is used as a fixture, thereby obtaining wide design freedom. Other constructions and effects are the same as those of the above-mentioned embodiments, so that the common members have the same reference numerals and their explanations are omitted here.

Embodiment 4

Figure 6:
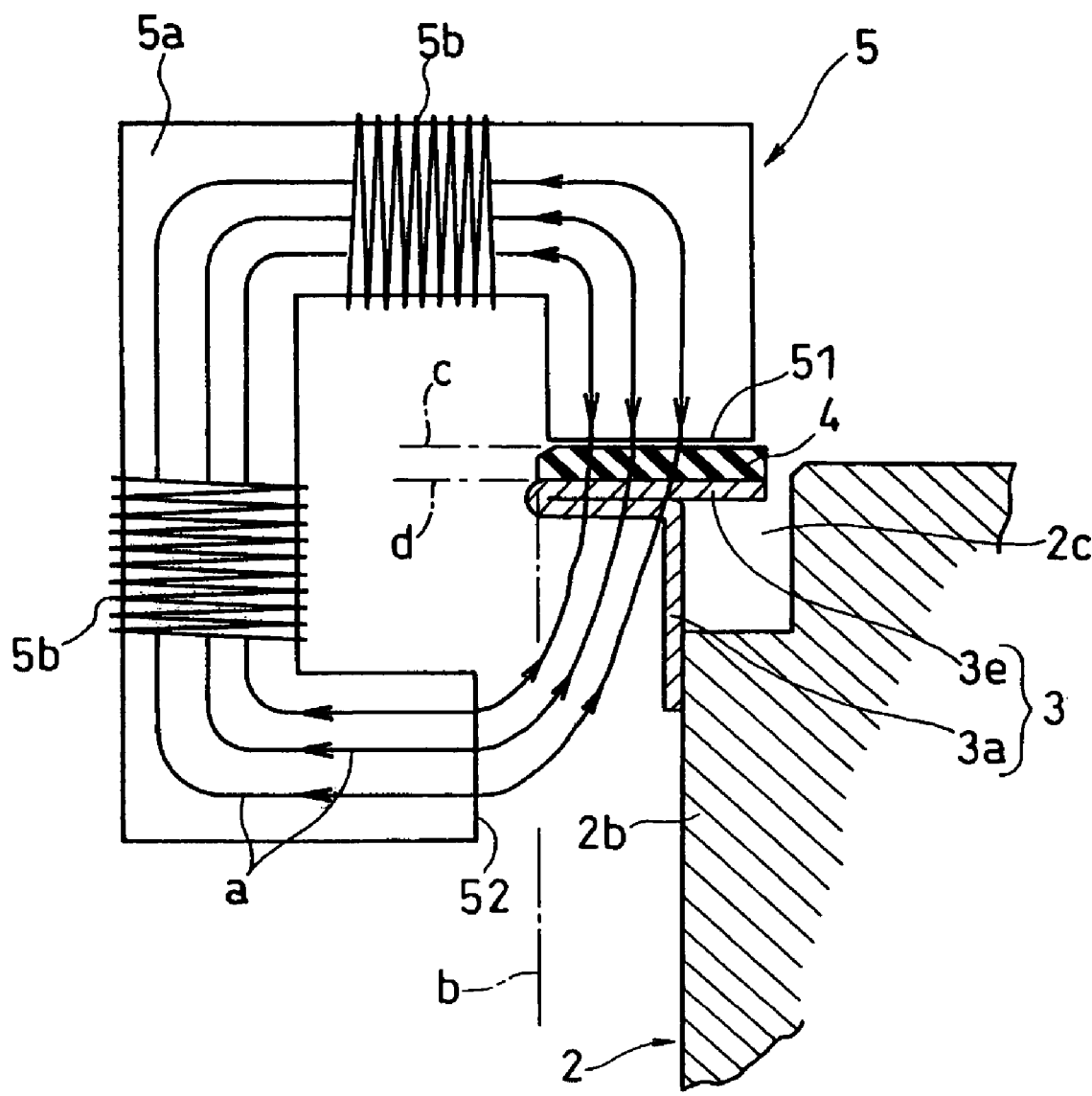
FIG. 6 is an enlarged view of the area "X" according to other embodiment.

The embodiment shown in FIG. 6 explains a magnetizing method in which the ring reinforcement 3 is comprised of the tubular part 3a and a plane annular part 3e which is formed by sheet metal processing so as to bend a part of the tubular part 3a to be folded (two parts, namely a tubular part and an other part integrally formed with the tubular part) and the annular body to be magnetized 4 is integrally attached on the plane annular part 3e. In this embodiment, the tubular part 3a of the ring reinforcement 3 is held and fixed to the fixture 2 like the above-mentioned embodiments, however, there is a space 2c formed by the smaller diameter part of the fixture 2 in the back of the tubular part 3a. The magnetizing yoke 5 is positioned in such a manner that the ring breakage end 51 (one end) of the magnetizing yoke 5 like the letter C is approached to the annular body to be magnetized 4 and the ring breakage end 52 (the other end) is positioned apart from the ring reinforcement 3. The apart position is outside of the outer circumference "b" of the annular body to be magnetized 4 attached on the plane annular part 3e and is near the ring reinforcement 3 from the upper face position "c" of the annular body to be magnetized 4. In this case, the ring breakage end 52 (the other end) is preferably positioned near the ring reinforcement 3 from the back face position "d" of the annular body to be magnetized 4. Therefore, the magnetic circular closed loop penetrating the annular body to be magnetized 4 is efficiently formed and a tone wheel with superior magnetic characteristic is obtained.

As mentioned above, an alternate electric current is applied to the coil 5b while rotating the fixture 2 around the axis L as mentioned above, a circular closed loop of the magnetic flux "a" is generated along the ring breakage end 51—the annular body to be magnetized 4—the ring reinforcement 3—the ring breakage end 52—the ring breakage end 51. In this case the ring breakage end 52 is apart from the ring reinforcement 3, however, the members other than the magnetizing yoke 5, the ring reinforcement 3 and the annular body to be magnetized 4 are made of non-magnetic material, so that there is no other space to form a circular closed loop of the magnetic flux and the same magnetizing as mentioned above is executed by the circular closed loop of the magnetic flux "a" as shown in the figure. The space 2c is formed in the back of the tubular part 3a and directivity of magnetic flux into the fixture 2 is weakened, thereby effectively forming a circular closed loop of the magnetic flux "a". Other constructions and effects are the same as those of the above-mentioned embodiments, so that the common members have the same reference numerals and their explanations are omitted here. In this case, even if the ring reinforcement 3 is made of non-magnetic material, the circular closed loop of the magnetic flux "a" as shown in the figure is formed.

Embodiment 5

Figure 7:
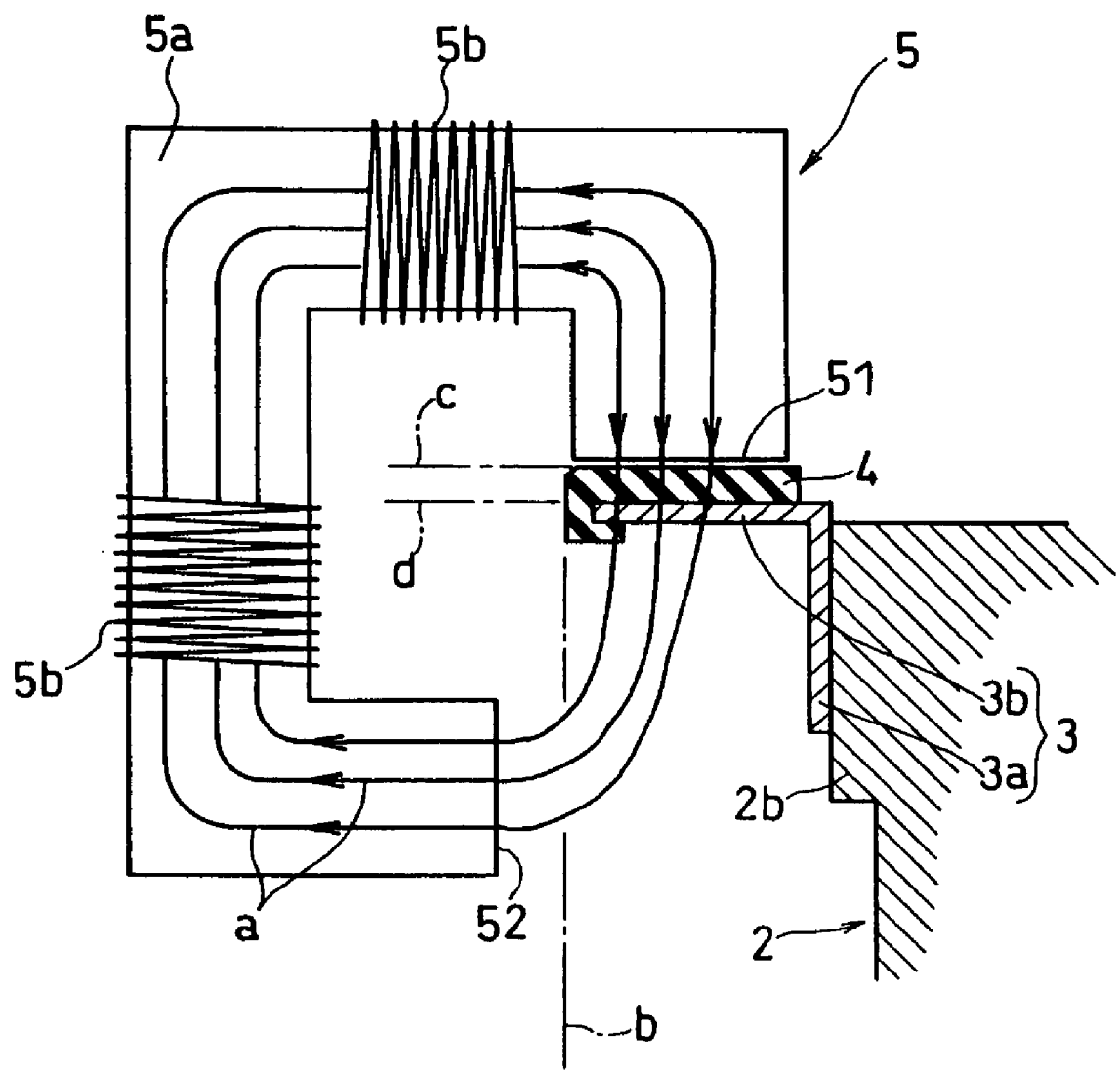
FIG. 7 is an enlarged view of the area "X" according to other embodiment.

The embodiment shown in FIG. 7 explains a modified embodiment of the magnetizing method by means of the ring enforcement 3 and the annular body to be magnetized 4 attached to the outward flange portion 3b as explained in the embodiment 1. As mentioned above, a circular closed loop of the magnetic flux "a" is generated along the ring breakage end 51—the annular body to be magnetized 4—the ring reinforcement 3—the ring breakage end 52—the ring breakage end 51. In this case, the ring breakage end 52 is apart from the ring reinforcement 3 like the embodiment 4, however, the members other than the magnetizing yoke 5, the ring reinforcement 3 and the annular body to be magnetized 4 are made of non-magnetic material, so that there is no other space to form a circular closed loop of the magnetic flux and the same magnetizing as mentioned above is executed by the circular closed loop of the magnetic flux "a" as shown in the figure. The positioning of the ring breakage end 52, the outer circumference "b" of the annular body to be magnetized 4, the upper face position "c" of the annular body to be magnetized 4, and the back face position "d" of the annular body to be magnetized 4 is preferably the same as that in the embodiment 4.

Embodiment 6

Figure 8:
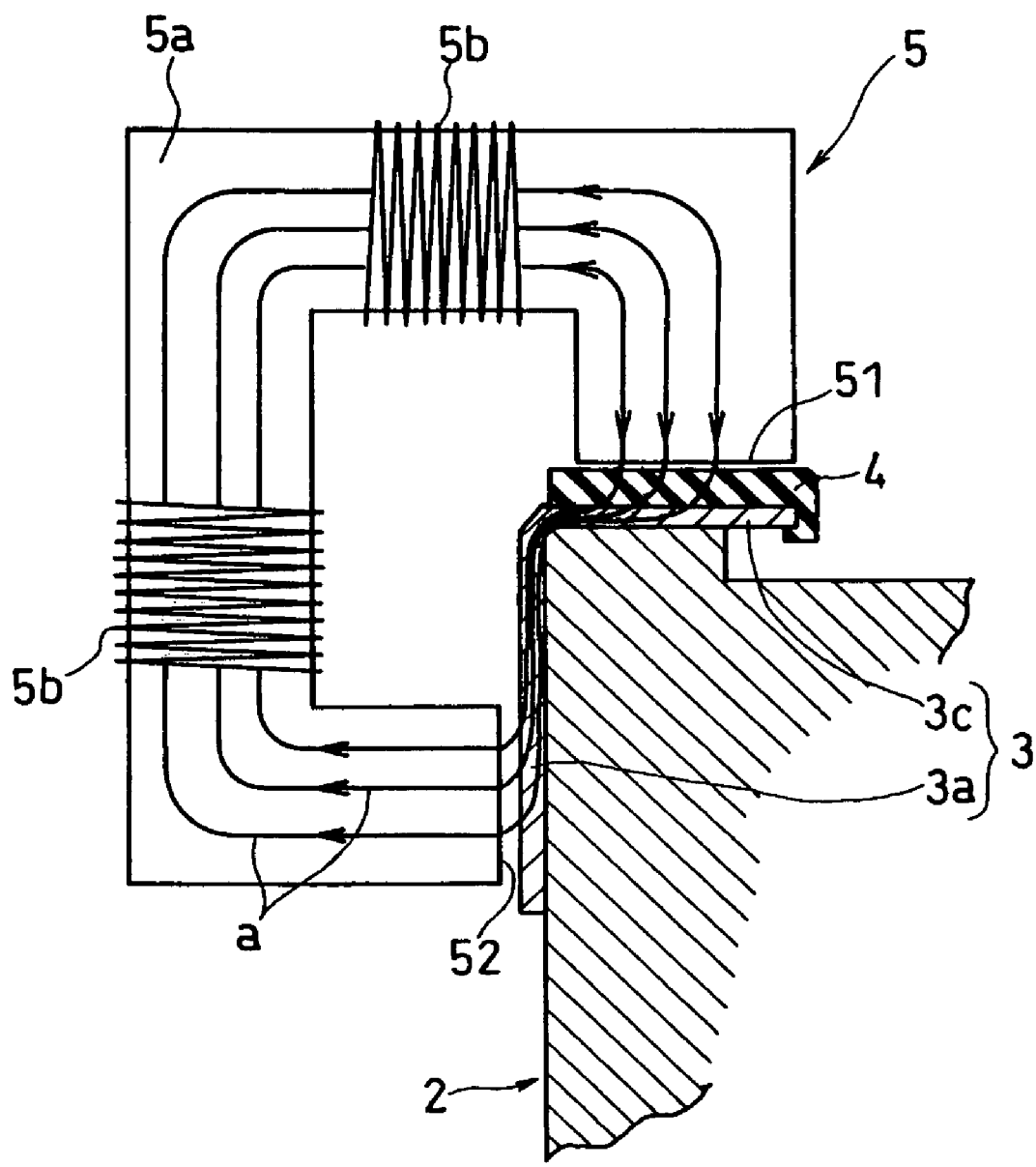
FIG. 8 is an enlarged view of the area "X" according to other embodiment.

Like the embodiment 2 the embodiment shown in FIG. 8 explains a magnetizing method in which the ring reinforcement 3 is made of the tubular part 3a and the inward flange portion 3c integrally formed with the tubular part 3a (two parts, namely a tubular part and an other part integrally formed with the tubular part) and the annular body to be magnetized 4 is integrally attached to the outer circumference (plane face) of the inward flange portion 3c. Also in this embodiment, the circular closed loop of the magnetic flux "a" is formed along the ring breakage end 51—the annular body to be magnetized 4—the ring reinforcement 3—the ring breakage end 52—the ring breakage end 51.

Embodiment 7

Figure 9:
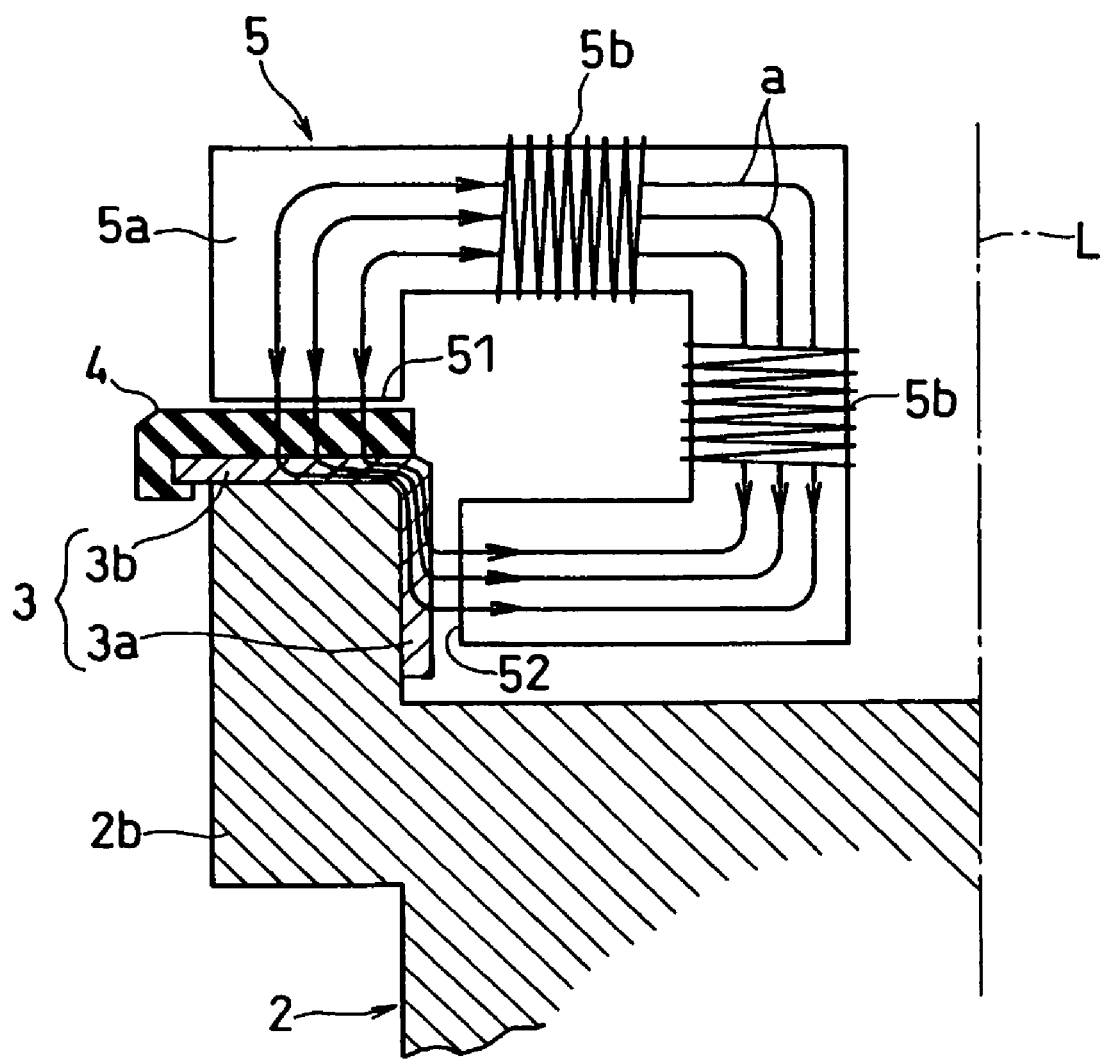
FIG. 9 is an enlarged view of the area "X" according to other embodiment.

In the embodiment shown in FIG. 9, the ring reinforcement 3 is made of the tubular part 3a and the outward flange portion 3c integrally formed with the tubular part 3a (two parts, namely a tubular part and an other part integrally formed with the tubular part) like the embodiment 1, however, the outer circumference of the tubular part 3a is held and fixed with the fixture 2. Namely, the chuck jaws 2b of the fixture 2 externally hold the tubular part 3a by being moved into centripetal direction. The annular body to be magnetized 4 is integrally attached to the outer circumference (plane face) of the outward flange portion 3b. Also in this embodiment, the circular closed loop of the magnetic flux "a" is formed along the ring breakage end 51—the annular body to be magnetized 4—the ring reinforcement 3—the ring breakage end 52—the ring breakage end 51.

Other constructions and effects in the embodiments 5–7 are the same as those of the above-mentioned embodiments, so that the common members have the same reference numerals and their explanations are omitted here.

Embodiment 8

Figure 10:
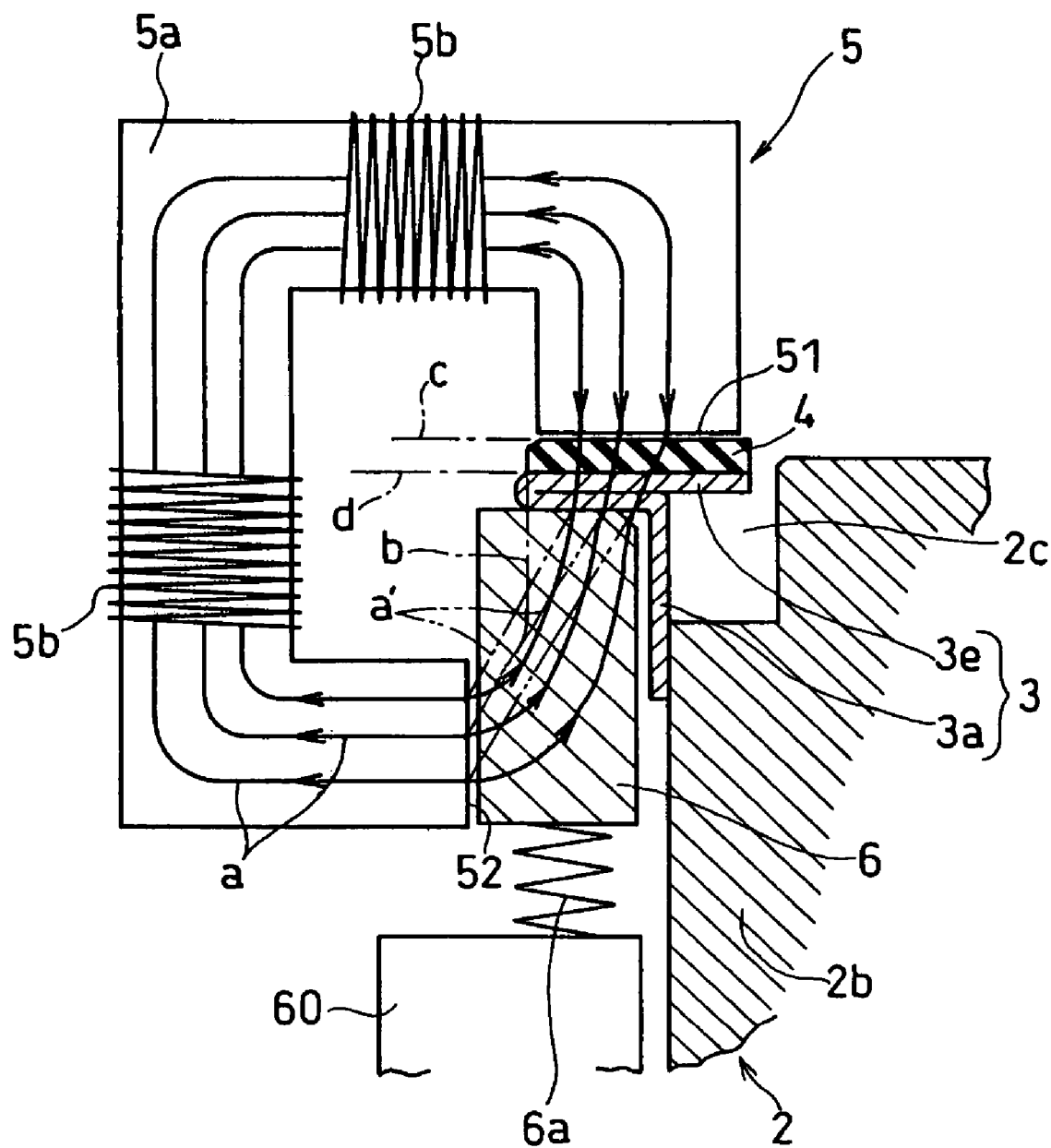
FIG. 10 is an enlarged view of the area "X" according to an embodiment in which a positioning table is used.

FIG. 10 shows an embodiment in which a ring-like positioning table 6 for positioning the annular body to be magnetized 4 attached to the ring reinforcement 3 made of magnetic material prior to applying alternate magnetic flux is interposed between the ring reinforcement 3 and the other end 52 of the magnetizing yoke 5 in the embodiment 4. The positioning table 6 is provided around the fixture 2 so as to be upwardly energized on a positioning base 60 by means of a compression spring 6a. The positioning table 6 is provided for positioning the annular body to be magnetized 4 at a fixed position. In a pre-process of magnetizing, the ring reinforcement 3 made of magnetic material attached with the annular body to be magnetized 4 is placed on the positioning table 6 as shown in the figure, a positioning base plate (not shown) is pressed onto the upper surface of the annular body to be magnetized 4 resisting the elasticity of compression spring 6a from above to keep the body 4 at a fixed position. Under such condition, the chuck jaws 2b . . . of the fixture 2 are operated to fix the ring reinforcement 3 to the fixture 2 by means of the tubular part 3a. Then, the positioning base plate is retracted and the same magnetizing as mentioned above is executed while rotating the fixture 2.

The positioning table 6 is preferably designed to be retracted into other position after completing the above-mentioned positioning. However, such design makes the apparatus complicated, so that the plate 6 is integrally or separately provided around the fixture 2 in general and is interposed between the ring reinforcement 3 made of magnetic material and the other end 52 of the magnetizing yoke 5. When the annular body to be magnetized 4 is magnetized with the magnetizing yoke 5 while rotating the fixture 2, a circular closed loop of a magnetic flux "a" is formed along the ring breakage end 51—the annular body to be magnetized 4—the ring reinforcement 3—the positioning table 6—the ring breakage end 52 as shown in the figure. When the positioning table 6 is made of magnetic material, a magnetic circular closed loop is effectively formed. However, when the plate 6 is positioned as shown in the figure, even if it is made of non-magnetic material, the forming efficiency of magnetic circular closed loop is not reduced so much. That is, when the positioning table 6 made of magnetic material is interposed between the ring reinforcement 3 made of magnetic material and the other end 52 of the magnetizing yoke 5, the alternate magnetic flux "a" forms the circular closed loop shown with the solid lines along the shape of the positioning table 6. When the positioning table 6 is made of non-magnetic material, the magnetic flux "a'" with the two-dotted lines in the figure is formed so as to connect the shortest distance of the ring reinforcement 3 made of magnetic material and the other end 52 of the magnetizing yoke 5. As the result, an alternate magnetic flux "a" forms a circular closed loop along the one end 51 of the magnetizing yoke—the annular body to be magnetized 4—the ring reinforcement 3—the positioning table 6—the other end 52 of the magnetizing yoke as shown in the figure. If the positioning table 6 is integrated with the fixture 2, they are rotated together. If the positioning table 6 is provided separately, it stands still while the fixture 2 is rotated. The positioning of the ring breakage end 52, the outer circumference "b" of the annular body to be magnetized 4, the upper face position "c" of the annular body to be magnetized 4, and the back face position "d" of the annular body to be magnetized 4 is preferably the same as that in the embodiment 4. Other constructions are the same as those of the above-mentioned embodiments, so that the common members have the same reference numerals and their explanations are omitted here.

Figure 11:
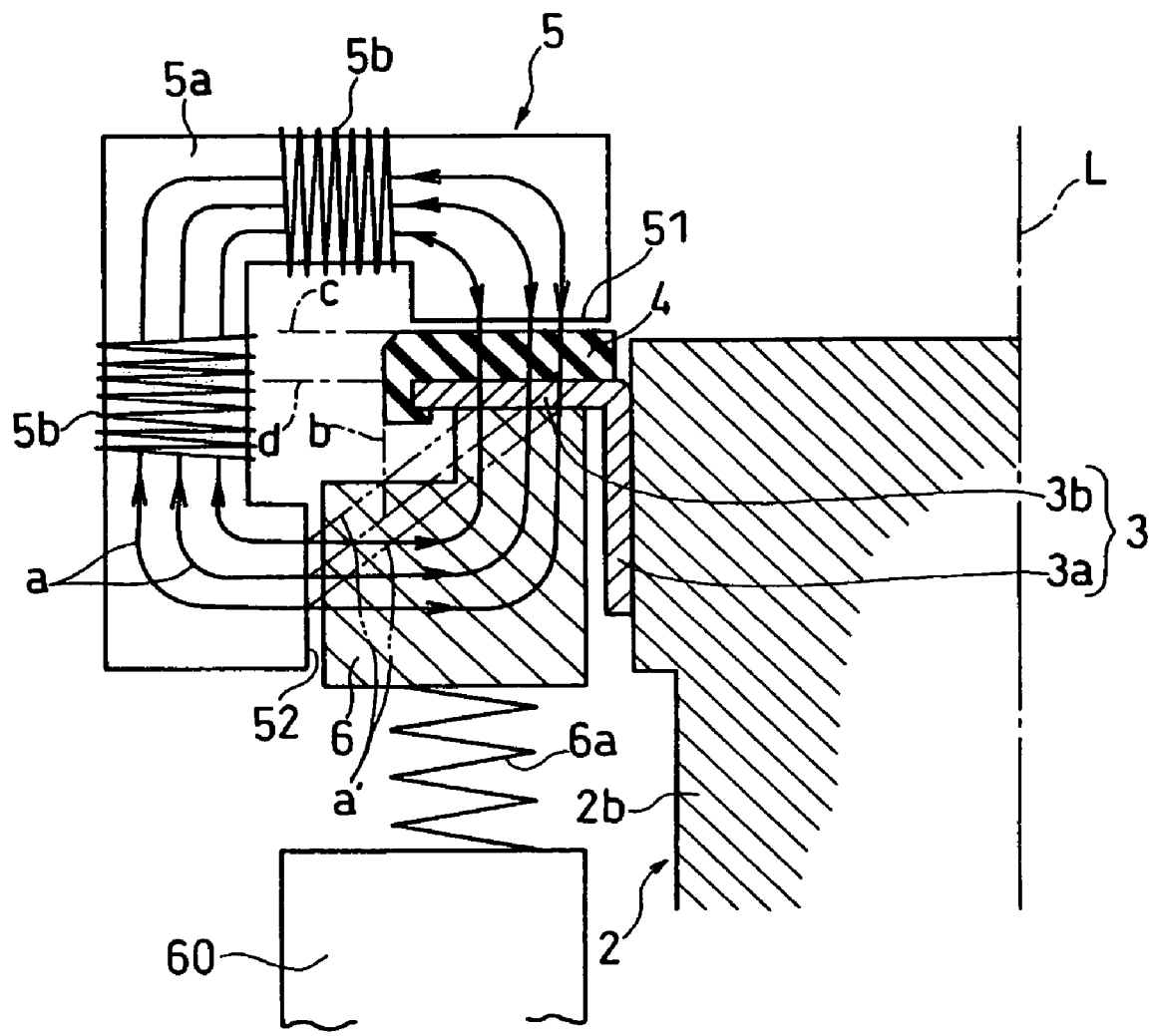
FIG. 11 is an enlarged view of the area "X" according to other embodiment in which a positioning table is used.

FIG. 11 shows an embodiment in which the ring-like positioning table 6 for positioning the annular body to be magnetized 4 attached to the ring reinforcement 3 made of magnetic material, prior to applying an alternate magnetic flux, is interposed between the ring reinforcement 3 made of magnetic body and the other end 52 of the magnetizing yoke 5 in the embodiment 5. When the positioning table 6 is made of magnetic material or a non-magnetic material, an alternate magnetic flux forms a circular closed loop along the one end 51 of the magnetizing yoke—the annular body to be magnetized 4—the ring reinforcement 3—the positioning table 6—the other end 52 of the magnetizing yoke (if the positioning table 6 is made of non-magnetic material, along the magnetic flux "a'" shown with two-dotted lines like the above-mentioned embodiment). Other constructions are the same as those of the embodiment 8, so that the common members have the same reference numerals and their explanations are omitted here.

Embodiment 10

Figure 12:
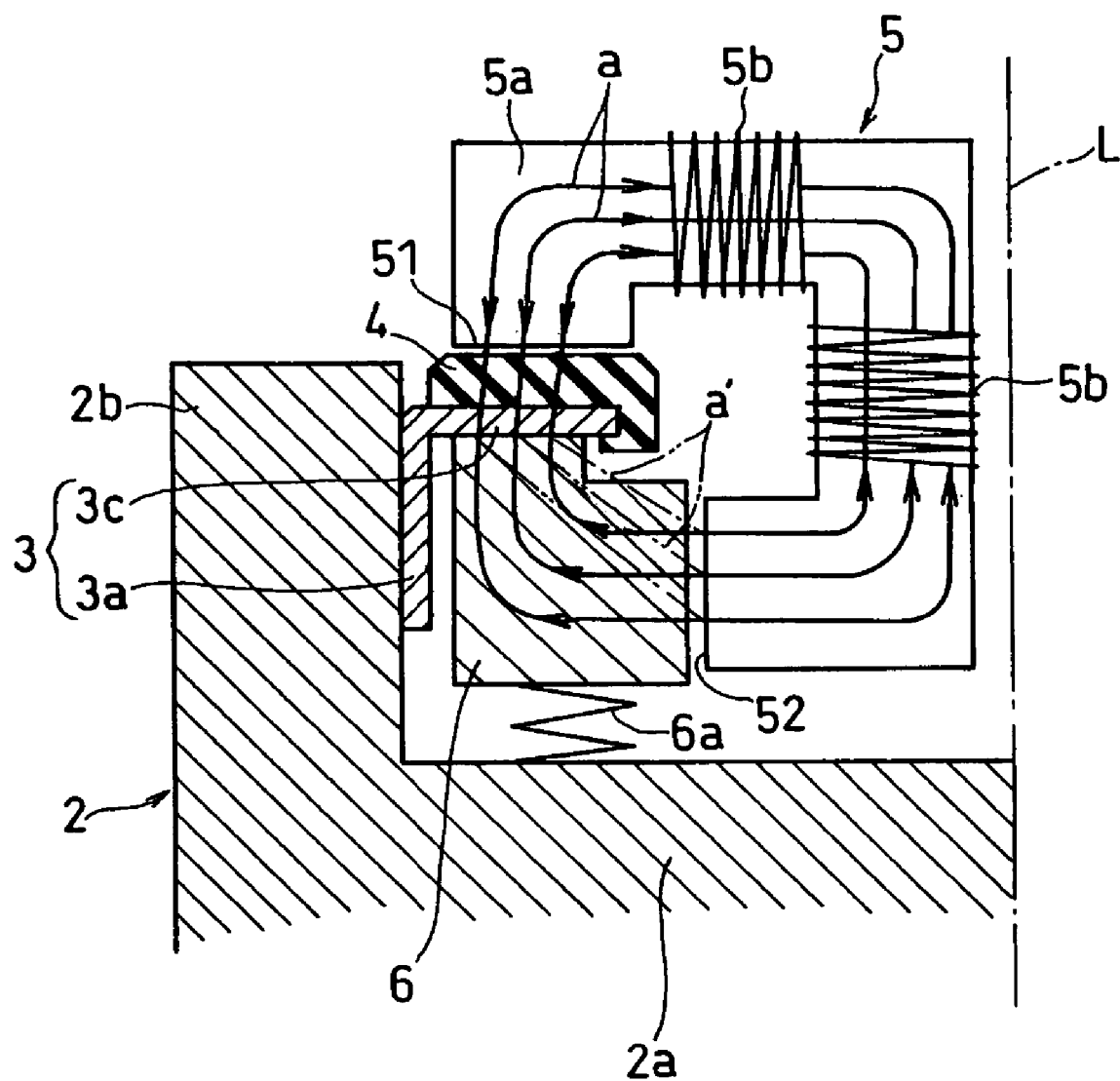
FIG. 12 is an enlarged view of the area "X" according to other embodiment in which a positioning table is used.
Figure 13:
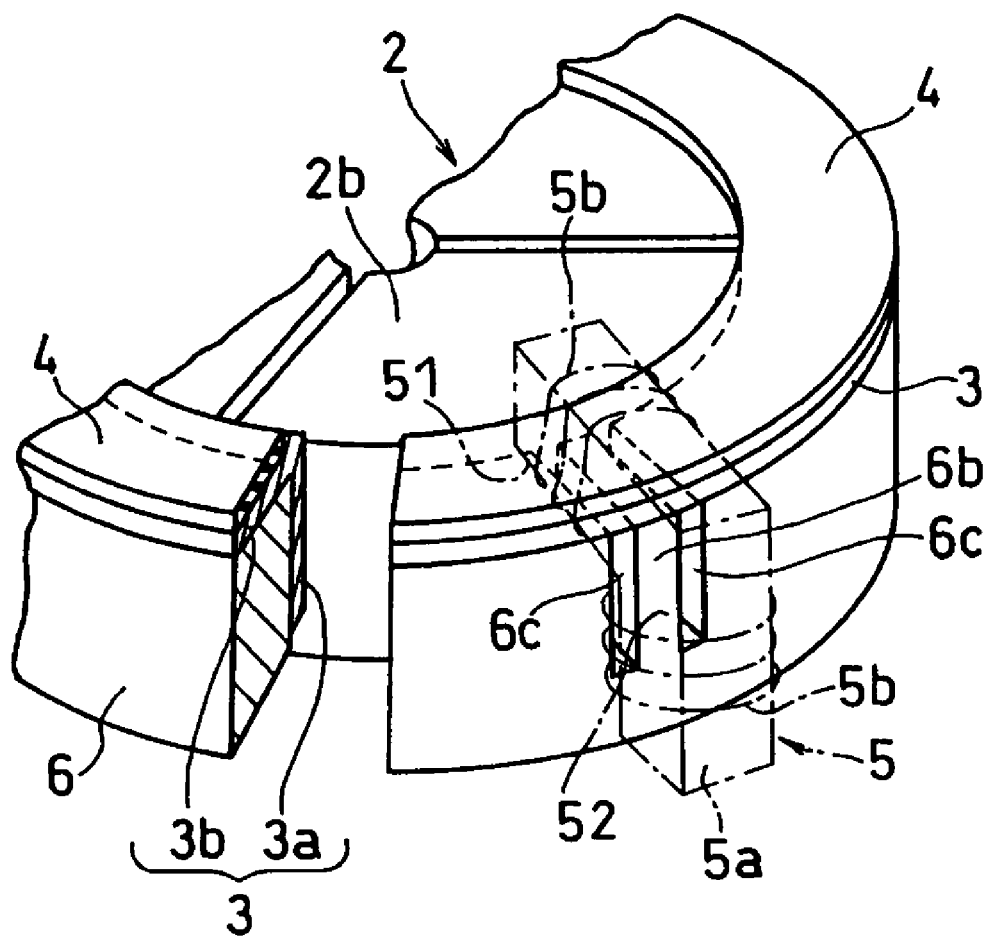
FIG. 13 is a partially cutaway perspective view of an essential part showing a modified embodiment shown in FIG. 10–FIG. 12.

FIG. 12 shows an embodiment in which the ring reinforcement 3 is made of the tubular part 3a and the inward flange portion 3c integrally formed with the tubular part 3a (two parts, namely a tubular part and an other part integrally formed with the tubular part), the annular body to be magnetized 4 is integrally attached to the outer circumference (plane face) of the inward flange portion 3c, the outer circumference of the tubular part 3a is held with the chuck jaws 2b . . . like the embodiment 7, the ring-like positioning table 6 for positioning the annular body to be magnetized 4 attached to the ring reinforcement 3 made of magnetic material, prior to applying an alternate magnetic flux, is interposed between the ring reinforcement 3 and the other end 52 of the magnetizing yoke 5. In this embodiment, the positioning table 6 is upwardly energized on the base 2a of the fixture 2 via the compression spring 6a in the chuck jaws 2b . . . and is rotated together with the fixture 2 around the axis L. Also in this embodiment, if the positioning table 6 is made of magnetic material or a non-magnetic material, the alternate magnetic flux forms a circular closed loop along the one end 51 of the magnetizing yoke—the annular body to be magnetized 4—the ring reinforcement 3—the positioning table 6—the other end 52 of the magnetizing yoke (if the positioning table 6 is made of non-magnetic material, along the magnetic flux "a" shown with two-dotted lines like the above-mentioned embodiment). Other constructions are the same as those of the embodiment 8, so that the common members have the same reference numerals and their explanations are omitted here.

Embodiment 11

FIG. 13 shows a modified embodiment in which the ring-like positioning table 6 is interposed between the ring reinforcement 3 made of magnetic body and the other end 52 of the magnetizing yoke 5. When the positioning table 6 is made of magnetic body and is fixedly provided (not rotated), gaps 6c, 6c are provided by cutting both sides of the positioning table 6 corresponding to the position of the magnetizing yoke 5, and a screen-like part 6b between the gaps 6c, 6c is formed as a part of the ring-like positioning table 6 intervened between the ring reinforcement 3 and the other end 52 of the magnetizing yoke 5. In case of magnetizing, an alternate magnetic flux forms a circular closed loop along the one end 51 of the magnetizing yoke—the annular body to be magnetized 4—the ring reinforcement 3 made of magnetic material—the part 6b of the positioning table 6—the other end 52 of the magnetizing yoke. In this case, leak of the magnetic flux is reduced because of the gaps 6c, 6c and the narrow part 6b of the positioning table 6 is formed as a magnetic flux path, thereby enlarging the magnetic flux density and forming a efficient magnetic circular closed loop.

The ring reinforcement 3 in this embodiment is made of the tubular part 3a and the outward flange portion 3c integrally formed with the tubular part 3a (two parts, namely a tubular part and an other part integrally formed with the tubular part) and the annular body to be magnetized 4 is integrally attached to the outer circumference (plane face) of the outward flange portion 3b. Although, the positioning pattern by the positioning table 6 and the holding and fixing pattern by the fixture 2 are similar to those in the embodiment 9, this embodiment can be applied to the positioning patterns with other ring reinforcement 3, annular body to be magnetized 4, and positioning table 6 and the holding and fixing pattern with other fixture 2.

The ring reinforcement 3 integrated with thus magnetized tone wheel is provided for the rotating member of the bearing system as a slinger and a combination seal ring of the bearing can be assembled. A magnetic sensor is provided for the fixing member so as to oppose the tone wheel, thus simply constructing a magnetic encoder for detecting the rotational velocity. The magnetizing pattern formed on the tone wheel is uniform and has high magnetizing accuracy in the circumferential direction, so that thus formed magnetic encoder has a large vocation for detecting the rotational velocity of automobile wheels.

The mechanism of the jaw type chuck means of the fixture 2 is not limited to those shown in the figures, and it goes without saying that other kinds of generally used chuck means can be used. It is possible to further provide a speed accelerator/reducer for the motor 1a of the rotary spindle apparatus 1 to change the formation interval of the S poles and N poles by varying the rotational speed of the fixture. Or it may be possible to provide a magnetizing power source for the S poles and the N poles respectively or to control the magnetizing power source output to vary the magnetizing strength depending on the purpose, associating with the output of the magnetizing yoke 5. In this case, the magnetizing current direction is switched (reversed) per a desired angle displacement by the signal from the encoder (not shown) provided for the spindle apparatus 1 during magnetizing. Thus varying a desired angle, the interval of magnetized S poles and N poles can be optionally changed. Further, the tubular part and the part integrally formed with one end thereof which comprise the ring reinforcement 3 are not limited to those shown in the figures, other configuration may be used as far as they are comprised of a tubular part and an other part integrally connected with the tubular part.

The invention claimed is:

1. A magnetizing method for tone wheel, comprising the steps of:
    preparing a ring reinforcement made of magnetic material and attached to an annular body to be magnetized, said ring reinforcement comprising a tubular part and an other part integrally formed with said tubular part;
    holding said tubular part of said ring reinforcement with a fixing means comprising a jaw type chuck means made of non-magnetic material; and
    applying an alternate magnetic flux to said annular body while axially rotating said fixing means, keeping one end of a magnetizing yoke approximate to the surface of said annular body, said alternate magnetic flux forming a circular closed loop which passes one end of said magnetizing yoke and the other end of said magnetizing yoke, via said annular body and said ring reinforcement midway,
    whereby said annular body is magnetized in a manner that S poles and N poles are alternately formed along its periphery.

2. The magnetizing method for tone wheel as set forth in claim 1
    wherein said annular body is made of a rubber material mixed with magnetic powder.

3. The magnetizing method for tone wheel as set forth in claim 2,
    wherein said jaw type chuck means has plural chuck jaws arranged in its circumferential direction and movable to its radial direction, for chucking said tubular part of said ring reinforcement.

4. The magnetizing method for tone wheel as set forth in claim 2, further comprising the step of disposing a ring-like positioning table for positioning said annular body attached on said ring reinforcement at a predetermined position between said ring reinforcement and said other end of said magnetizing yoke, prior to applying alternate magnetic flux to said annular body, wherein said alternate magnetic flux applied to said annular body forms a circular closed loop which passes said one end of said magnetizing yoke and other end of said magnetizing yoke, via said annular body, said ring reinforcement and said positioning table midway.

5. The magnetizing method for tone wheel as set forth in claim 1,
    wherein said jaw type chuck means has plural chuck jaws arranged in its circumferential direction and movable to its radial direction, for chucking said tubular part of said ring reinforcement.

6. The magnetizing method for tone wheel as set forth in claim 1, further comprising the step of disposing a ring-like positioning table for positioning said annular body attached on said ring reinforcement at a predetermined position between said ring reinforcement and said other end of said magnetizing yoke, prior to applying alternate magnetic flux to said annular body, wherein said alternate magnetic flux applied to said annular body forms a circular closed loop which passes said one end of said magnetizing yoke and other end of said magnetizing yoke, via said annular body, said ring reinforcement and said positioning table midway.

7. A magnetizing apparatus for tone wheel, further comprising:
    an axially rotatable fixing means comprised of a jaw type chuck means made of non-magnetic material, for holding a tubular part of a ring reinforcement on which an annular body to be magnetized is attached, said ring reinforcement comprising the tubular part and an other part integrally formed with said tubular part; and
    a magnetizing yoke provided with at least two magnetizing ends,
    wherein said apparatus generates a circular closed loop of an alternate magnetic flux passing said one end of said magnetizing yoke and the other end of said magnetizing yoke via said annular body and said ring reinforcement midway, while axially rotating said fixing means, keeping one end of said magnetizing yoke approximate to the surface of said annular body,
    whereby said annular body is magnetized in a manner that S poles and N poles are alternately formed along its peripheral direction.

8. The magnetizing apparatus for tone wheel as set forth in claim 7, wherein said annular body is made of a rubber material mixed with magnetic powder.

9. The magnetizing apparatus for tone wheel as set forth in claim 8, wherein said jaw type chuck means has plural chuck jaws arranged in its circumferential direction and movable to its radial direction, for chucking the tubular part of said ring reinforcement.

10. The magnetizing apparatus for tone wheel as set forth in claim 8, wherein said apparatus further comprises a ring-like positioning table for positioning said annular body attached on said ring reinforcement at a predetermined position between said ring reinforcement and said other end of said magnetizing yoke, and wherein said apparatus applies a circular closed loop of an alternate magnetic flux which passes said one end of said magnetizing yoke and the other end of said magnetizing yoke, via said annular body, said ring reinforcement, and said ring-like positioning table midway.

11. The magnetizing apparatus for tone wheel as set forth in claim 7,
wherein said jaw type chuck means has plural chuck jaws arranged in its circumferential direction and movable to its radial direction, for chucking the tubular part of said ring reinforcement.

12. The magnetizing apparatus for tone wheel as set forth in claim 7, wherein said apparatus further comprises a ring-like positioning table for positioning said annular body attached on said ring reinforcement at a predetermined position between said ring reinforcement and said other end of said magnetizing yoke, and wherein said apparatus applies a circular closed loop of an alternate magnetic flux which passes said one end of said magnetizing yoke and the other end of said magnetizing yoke, via said annular body, said ring reinforcement, and said ring-like positioning table midway.

\* \* \* \* \*